No. 758,056.

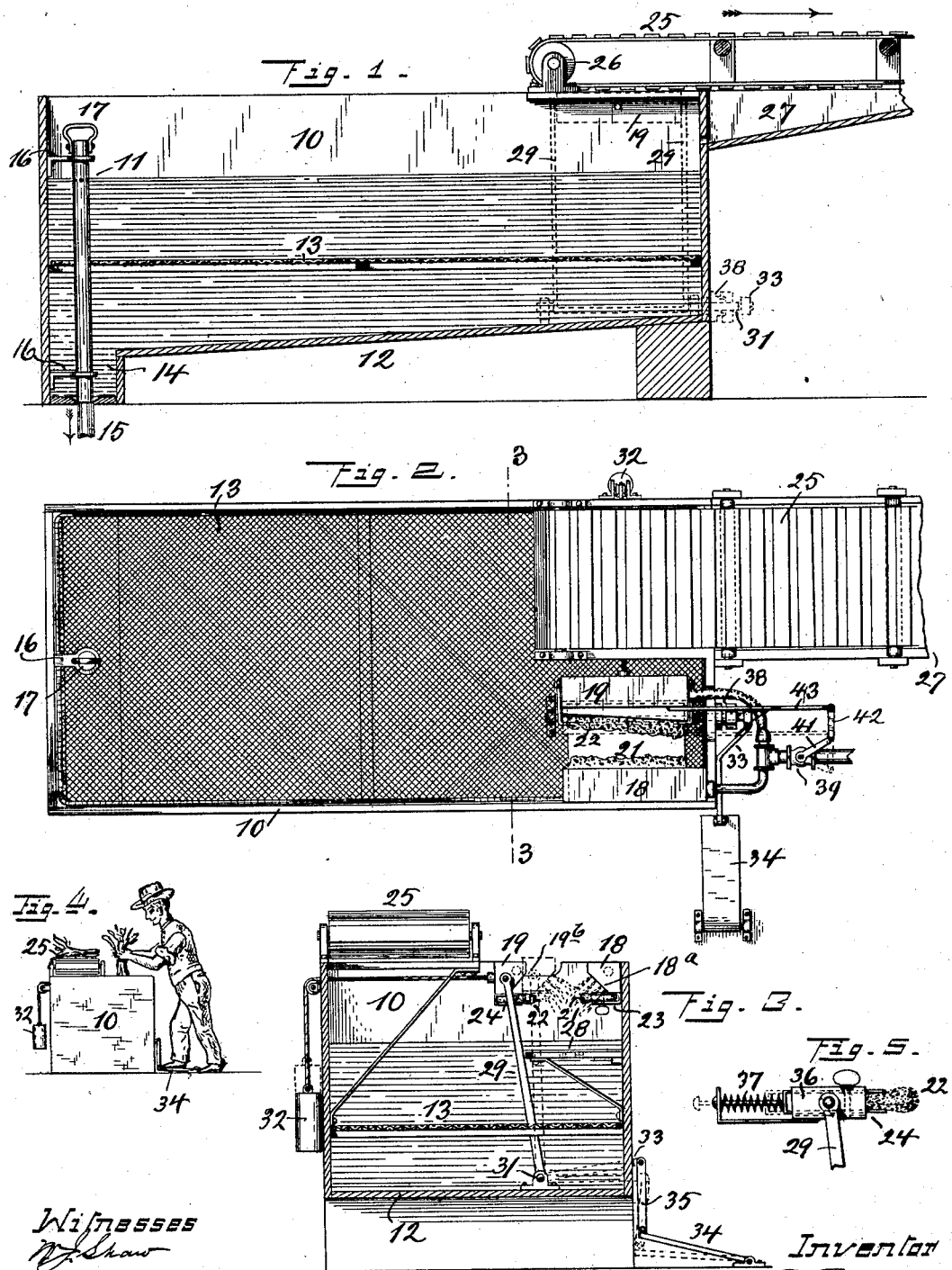

Patented April 26, 1904.

UNITED STATES PATENT OFFICE.

JOHN F. FUGAZZI, OF CINCINNATI, OHIO.

VEGETABLE-WASHER.

SPECIFICATION forming part of Letters Patent No. 758,056, dated April 26, 1904.

Application filed January 17, 1903. Serial No. 139,367. (No model.)

*To all whom it may concern:*

Be it known that I, JOHN F. FUGAZZI, a citizen of the United States, and a resident of the city of Cincinnati, in the county of Hamilton and State of Ohio, have invented a certain new and useful Vegetable-Washer; and I do declare the following to be a clear, full, and exact description thereof, attention being called to the accompanying drawings, with the reference-numerals marked thereon, which form also a part of this specification.

This invention relates to a device for washing vegetables for the market, the object being to remove and clean away any adhering sand, earth, or other matter before they pass into the hands of the buyers and consumers.

The invention is intended more particularly for use in connection with celery, the object being to remove from the white stalks any adhering impurities and foreign substances.

The invention consists of the particular construction of the device as the same, together with its parts and manner of use, is described and claimed in the following specification and as illustrated in the accompanying drawings, in which—

Figure 1 shows a longitudinal section of my vegetable-washer. Fig. 2 is a top view of the same. Fig. 3 is a vertical cross-section on line 3 3 of Fig. 2. Fig. 4 is an end view, at reduced scale, showing manner of use of the apparatus. Fig. 5 shows a modified construction of the sponge-holding part of the device.

The operation of my device contemplates the use of water first for the purpose of loosening sand and earth adhering to the stalks, for which purpose these latter are immersed and left soaking for a suitable time, after which they are lifted out and rinsed off with clean water.

The apparatus consists, primarily, of a tank 10, which may be of wood or sheet metal or of the former material and lined with the latter and is constructed so as to be adapted to hold water. Its top is entirely open to be accessible, and by means of an overflow-pipe 11 the water-level is maintained so as to be somewhat below the top, as shown in the drawings. Below this maintained water-level and above the bottom 12 there is an intermediate floor 13, which serves as a support for the vegetables and upon which they rest while subjected to the preliminary action of water, which is by immersion and soaking. This floor is constructed in any suitable manner rendering it perforate, the object being to prevent any of the vegetables from sinking to the bottom of the tank, but at the same time permitting sand, earth, and other matter loosened from them to pass through and settle to the bottom of the tank below, so as to become thereby separated from the vegetables. For such purpose this floor consists of suitable perforated material, like a wire screen, as shown. Bottom 12 is inclined toward one end and provided with a pocket 14 thereat, within which the sediment deposited on bottom 12 accumulates and from which from time to time it is discharged through an outlet-pipe 15. The lower end of overflow-pipe 11 by being seated in the upper end of this outlet-pipe keeps this latter normally closed. It is guided between brackets 16 and by means of a handle 17 can be raised to open the outlet-pipe to flush pocket 14. The vegetables after subjection to this preliminary bath for a certain time or immediately after immersion, if expedient, are lifted out by an attendant, who takes a suitable bunch with both hands and while so holding the same passes it between two rinsing-heads 18 and 19, having opposite inclined faces $18^a$ and $19^a$, which are perforated and from which water discharges, the direction of the discharge being into the space between the heads and downwardly, so as to come fully in contact with the vegetables. These latter are held into this space and preferably turned around and also passed up and down several times to thoroughly subject all parts to the rinsing action of the water. At the same time the vegetables or stalks come in contact with a suitable scouring or scrubbing medium sufficiently soft and yielding to prevent cutting or breaking of the stalks. For such purpose I provide two rubbers 21 and 22, one on each side below the rinsing-heads and which consist of brushes made of suitable material. I prefer to use sponges as the material, held between two holding-clamps 23 and 24, one below each head on each side. The inner opposite edges of these rubbers, or sponges in this case, project beyond the inner opposite sides of the rinsing-heads, so that the bunched vegetables while being moved up and down come in contact with these rubbers, whereby, in addition to the simultaneous action of the water, the stalks are thoroughly and substantially cleaned. After the rinsing operation the vegetables are thrown upon an endless carrier-belt 25, which is caused to move and whereby they are carried away and discharged at a suitable point or taken off thereat by another attendant for packing or disposal otherwise. The ends of this belt are supported on rollers 26, one of which is rotated by any suitable means. The material of this apron should be such as to permit the water and moisture to drain from the vegetables while they are carried away, so that by the time they arrive at the point of delivery they are comparatively dry—that is, free from dripping water. For such purpose a perforated material, open-mesh fabric, or wire-cloth may be used. The water drains into a gutter 27, by which it is returned into the main tank. This water, as well as that discharged from the rinsing-heads 18 and 19, forms the supply of tank 10 and is maintained therein at a fixed level by the overflow-pipe 11. If it is desired that the rinsing action upon any particular bunch be continued, a shelf 28 is provided upon which the particular bunch is set, thus avoiding that the same be held by the hands during that time. The opposite rinsing-heads and rubbers are preferably adjustable with reference to each other—that is to say, on one side the rinsing-head and rubber below it are supported so as to be movable to and from the same parts on the other side. Normally the movable side is farthest away from the other side to permit passing in of the vegetables in an easy and convenient manner between them, after which the movable side is caused to move over toward the other side as close as the thickness of the vegetables between them permits. In this manner the rubbers will come in close and proper contact with the vegetables to do their work. The inner—that is, free or opposite—edges of the sponges project beyond the inner sides of the rinsing-heads above to prevent these latter from coming in contact with the vegetables. In the case shown head 19 is the movable one and its movement is preferably a swinging one, its support being arranged accordingly. As shown in Fig. 3, I use two standards 29, engaging at their upper ends the ends of the rinsing-head and attaching with their lower ones to a rock-shaft 31, supported in bearings in the lower part of the tank. Movement in one direction is preferably automatic, induced by springs or a weight, as shown at 32, while the other movement is positive and operated by suitable mechanical means. I prefer to have the opening movement automatic and the closing movement positive. For purposes of this latter I use a lever 33, attached to one end of rock-shaft 31, which projects beyond the tank, and which lever is oscillated by means of a treadle 34 and intermediate link 35.

Instead of moving the rinsing-head the latter may be supported to be stationary in the remotest position from the other head and the particular rubber only may be movable, as shown in Fig. 5. Again, in either case where the rubber moves, either alone or in conjunction with its rinsing-head, it is preferably supported so as to be yieldable, so that its impact with the vegetables is cushioned to prevent the latter from being mashed or bruised. For such purpose the rubbers, or in this case the sponge-holding clamps 23 and 24, are supported to have an independent movement outside of the movement to and from the other rubber, which movement is a yielding one between guides 36, as shown in Fig. 5. The rubbers, or sponges in this case, if the closing movement is an abrupt or forcible one, will yield as soon as coming in contact with the vegetables between them, thereby preventing injury to the same. Cushion-springs 37 back of the rubber hold the same to its normal position. One of the bearings for rock-shaft 31 forms at the same time a stuffing-box 38 where the same passes through the end of the tank.

Supply of water to the rinsing-heads is controlled by a cock 39. In cases where all unnecessary waste of water must be prevented said cock may be automatically controlled by operative connection from the movable parts of the rinsing-head or rubber and in a manner that water discharges only after the vegetables are in place and the movable parts have been moved into operative position. This connection consists of a key 41 on cock 39 and a link 42 and rod 43, whereby it is connected to the movable parts.

The manner of use is apparent from Fig. 4. The operator lifts a bunch of the vegetables from floor 13, where it has received its preliminary bath, and passes the same into the space between the rinsing-heads, where he moves it up and down and back and forth, so as to thoroughly subject it to the action of the discharging water. Next he throws it onto the conveyer-belt, whereby it is carried away, after which he is ready to take up another bunch. The discharge of water stops as soon as the operator takes his foot off of treadle 34, so that the water is shut off and no waste occurs whenever he leaves his position.

Having described my invention, I claim as new—

1. In a vegetable-washer, the combination of a tank in which the vegetables receive a preliminary bath, two opposite rubbers between which the vegetables are to be cleaned thereafter, they being supported movably with reference to each other, mechanism whereby this movement is positively performed, means to supply water to obtain a simultaneous rinsing operation, a cock to control this water-supply and operative connection between it and the mechanism mentioned whereby operation of this latter causes also automatic operation of the cock.

2. A scouring and rinsing device for cleaning vegetables consisting of two hollow rinsing-heads supported opposite each other, means to supply water to them, perforations in their opposite faces to permit discharge of such water into the space between these heads and a scouring device attached to the under side of each one of these heads and projecting into the space between them.

In testimony whereof I hereunto set my signature in the presence of two witnesses.

JOHN F. FUGAZZI.

Witnesses:
C. SPENGEL,
ARTHUR KLINE.